Figure 1:
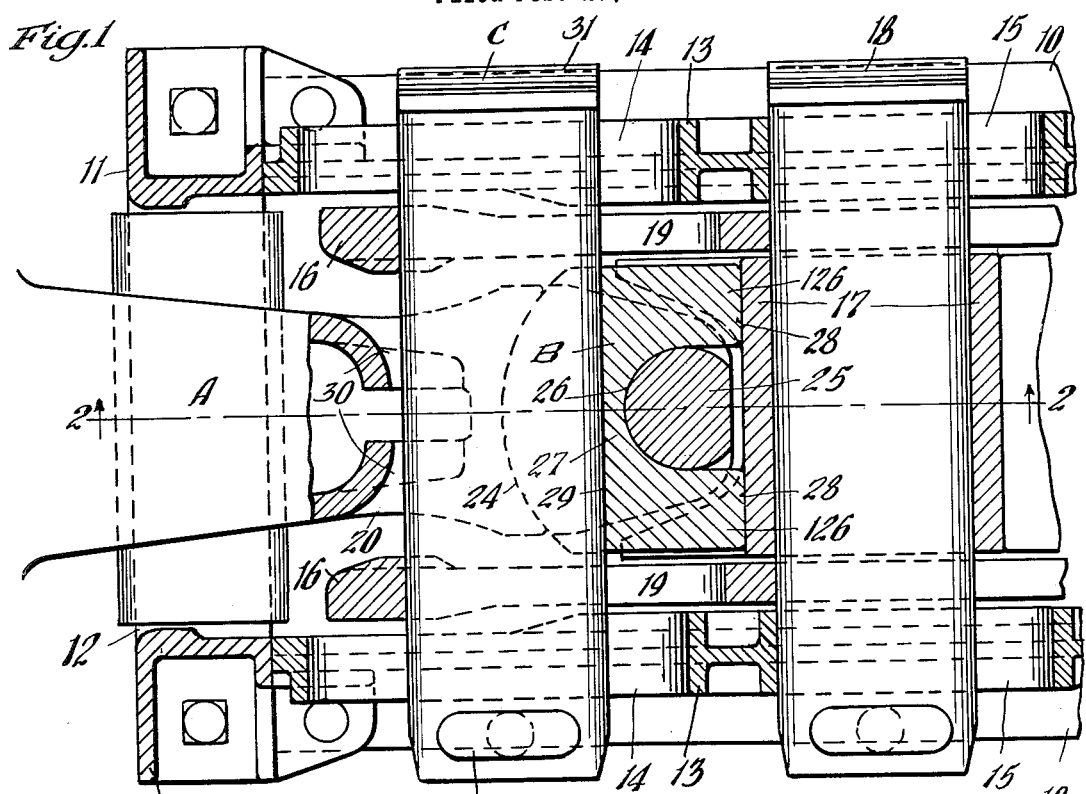

May 8, 1934.  S. B. HASELTINE  1,957,643
PIVOTAL COUPLER CONNECTION
Filed Feb. 27, 1931   2 Sheets-Sheet 1

Witness
Wm. Geiger

Inventor
Stacy B. Haseltine
By Henry Fuchs, Atty.

May 8, 1934.    S. B. HASELTINE    1,957,643
PIVOTAL COUPLER CONNECTION
Filed Feb. 27, 1931    2 Sheets-Sheet 2
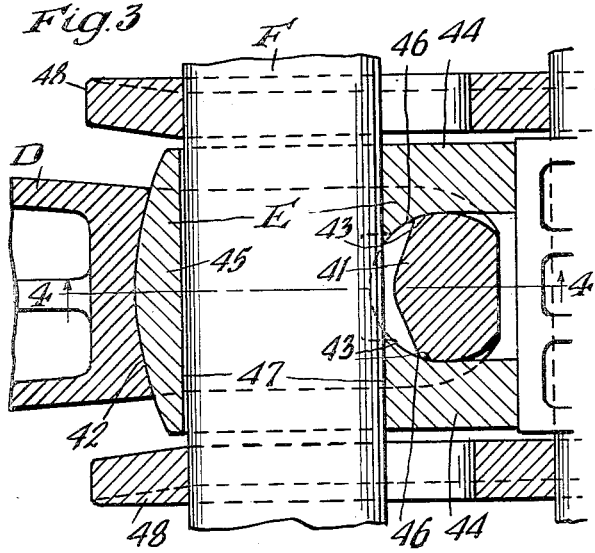
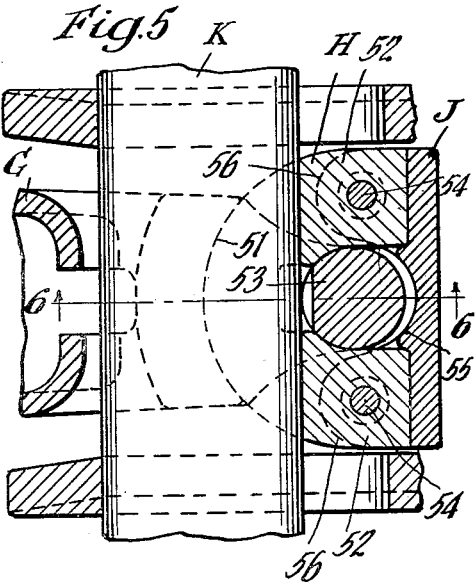
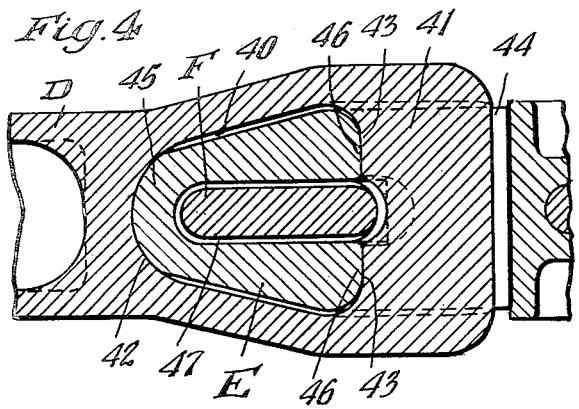
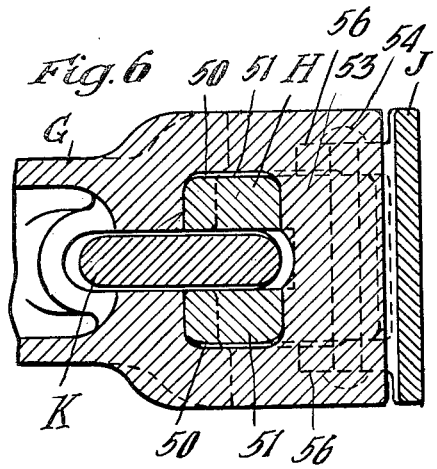
Inventor
Stacy B. Haseltine
By Henry Fuchs Atty.
Witness
Wm. Geiger Patented May 8, 1934

1,957,643

UNITED STATES PATENT OFFICE 1,957,643

PIVOTAL COUPLER CONNECTION

Stacy B. Haseltine, Chicago, Ill., assignor to W. H. Miner, Inc., Chicago, Ill., a corporation of Delaware Application February 27, 1931, Serial No. 518,754

3 Claims. (Cl. 213—69)

This invention relates to improvements in pivotal coupler connections.

One object of the invention is to provide a coupler connection for draft riggings of railway cars of simple, rugged design comprising a coupler member having a butt block swiveled to the shank thereof, wherein the swivel connection is formed by bearing means integral with the coupler shank and on which the butt block is directly swiveled, the bearing means of the shank comprising a concave bearing surface and a pivot member spaced from said surface and concentric therewith, said concave bearing surface having engagement with a front bearing surface on the butt block, and the pivot member of the shank having engagement with a concave bearing seat on the block, the latter being interlocked with the coupler shank against removal in a lateral direction through the shouldered engagement provided by the cooperating curved bearing surfaces of the block and coupler shank, detachment of the block being possible only by rotary movement of the block on the pivot member to a predetermined extent, the required amount of rotary movement being possible only after the parts have been removed from between the draft sills and detached from the yoke.

Another object of the invention is to provide a coupler connection for draft riggings of railway cars composed of a minimum number of parts and affording an exceptionally strong and reliable pivotal connection including a coupler member having a shank provided with a pivoted butt block wherein the shank has an integral pivot member on which the block is swiveled and the block is held in operative assembled relation with the coupler by means of the pivot member and additional cooperating curved bearing surfaces on the coupler shank and block, and the block cooperates with the key which connects the coupler to the usual yoke member of the railway draft rigging to transmit draft movements thereto.

A further object of the invention is to provide a pivotal coupler connection of the character specified in the preceding paragraph wherein the pivoted butt block is of U-shaped form and has the arms thereof straddling the integral pivot member of the coupler shank, the section connecting the arms of the U-shaped member having direct bearing engagement with both the curved bearing surface on the coupler shank and the pivot member thereof and swiveling thereon to provide for lateral swinging movement of the coupler without imparting such movement to the coupler key and wherein both the buff and draft forces are transmitted to the butt block.

Other objects of the invention will more clearly appear from the description and claims hereinafter following.

Figure 2:
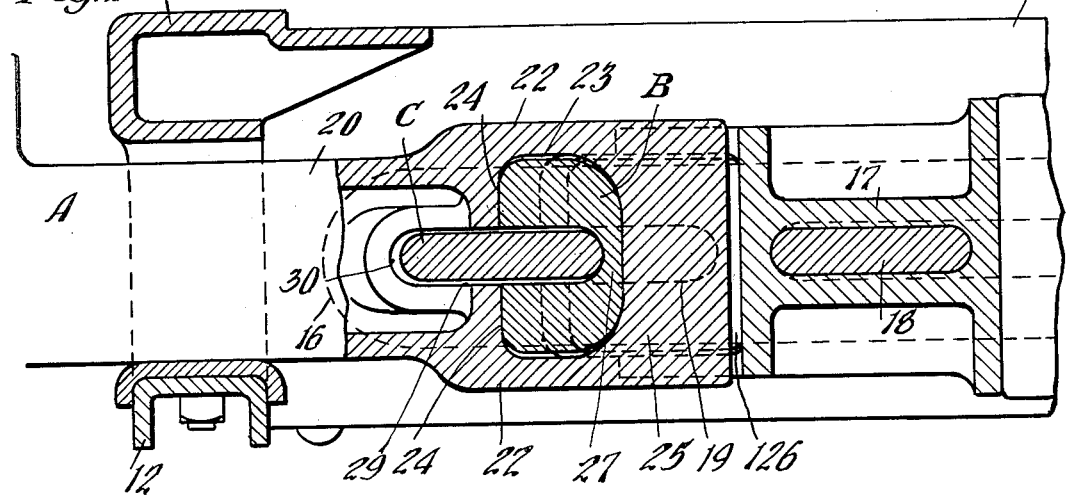

In the drawings, forming a part of this specification, Figure 1 is a horizontal, longitudinal, sectional view through the underframe structure of a railway car, at one end of the latter, illustrating my improvements in connection therewith. Figure 2 is a vertical, longitudinal, sectional view corresponding substantially to the line 2—2 of Figure 1. Figure 3 is a view similar to Figure 1, illustrating a different embodiment of the invention, the underframe structure of the car being omitted in this view. Figure 4 is a longitudinal, vertical, sectional view corresponding substantialy to the line 4—4 of Figure 3. Figure 5 is a view similar to Figure 3, illustrating still another embodiment of the invention. And Figure 6 is a longitudinal, vertical, sectional view corresponding substantially to the line 6—6 of Figure 5.

Referring first to the embodiment of the invention illustrated in Figures 1 and 2, 10—10 indicate channel shaped center or draft sills of a railway car underframe, the sills having a striking casting 11 fixed to the outer ends thereof. The striking casting is provided with the usual carry iron 12 which is detachably secured thereto. The sills are also provided with cheek plates 13—13 having key slots 14 and 15. The yoke member of the railway draft rigging is indicated by 16, and as shown, is of the horizontal type. The yoke member incloses the usual shock absorbing mechanism, not shown, and a front follower block 17 having a key 18 extending therethrough, the key having its opposite ends working in the slots 15—15 of the center sills. The front ends of the side arms of the yoke 16 are slotted as indicated at 19—19 to receive the usual coupler key.

My improved pivotal coupler connection, illustrated in Figures 1 and 2, comprises broadly a coupler A having a shank provided with integral pivot means; a butt block B pivoted on the coupler shank; and a coupler key C connecting the parts to the usual yoke.

The coupler A, the head of which is omitted, comprises a shank portion 20 which tapers rearwardly for the greater part of its length, as clearly shown in Figure 1. The rear end portion of the shank is vertically thickened as indicated at 22 in Figure 2. The extreme rear end portion of the shank is of the horizontal cross section as shown in Figure 1, that is, the inner end of the shank is tapered rearwardly while the section immediately forwardly thereof tapers forwardly. The thickened portion 22 of the coupler shank is provided with a transverse opening 23 which is substantially of the outline shown in Figure 2. The opening 23 is defined by a concave front wall 24 and a postlike member 25 forming the rear wall. The postlike member is formed integral with the shank proper of the coupler and has a substantially cylindrical bearing surface 26 concentric with the front wall 24, thus forming in effect a pinlike pivot member. The rear face of the post 25 is preferably flattened as shown in Figure 1.

The butt block B is in the form of a U-shaped casting having side arms 126—126 and a section 27 connecting the front ends of the side arms. The section 27 is curved, as shown, so as to fit between the cylindrical post 25 and the concave bearing wall 24, that is, the front and rear surfaces of the section 27 are curved to fit the bearing wall 24 and the cylindrical pivot member 25. The side arms 126—126 of the butt block B project rearwardly of the post member 25 of the coupler shank and have flat rear abutment surfaces 28—28 which bear directly on the flat front end face of the follower block 17. The shank of the coupler and the front portion of the butt block B are transversely slotted, thereby providing a coupler key receiving opening or slot 29. The front wall in that portion of the slot 29 formed in the coupler shank proper is convex as indicated at 30.

The coupler A is connected to the yoke 16 by means of the key C. The key C extends through the slot 29 of the coupler shank and butt block B, through the slots 19—19 of the arms of the yoke, and has the outer ends thereof guided in the slots 14—14 of the draft sills. In the normal position of the parts the rear edge of the key C bears directly on the rear end wall of the slot 29, and the front edge thereof is slightly spaced from the convex front end wall 30 formed in the coupler shank proper. In the present instance the front follower 17 is provided with top and bottom side lugs which have opposed inner edge faces diverging forwardly. The rear end portion of the coupler shank is so formed as to be accommodated between the forwardly projecting arms of the front follower and sufficient clearance is provided to allow for the necessary lateral, swinging or rocking movement of the coupler. The key C is of the usual type, having a head 31 at one end and a retaining pin or bolt 32 extending through the other end thereof.

In assembling the butt block B with the coupler member, one of the arms of the block is first entered into the opening 23 so as to occupy the space between the post member 25 and the curved front wall 24 of the opening. The block is then advanced and rotated about the post 25 until it assumes the position shown in Figure 1. The coupler, with the block thus attached, is then applied to the railway draft rigging and the coupler key inserted through the key slot 29. As will be evident, when the coupler with the block B attached thereto is disposed within the yoke member of the railway draft rigging, disengagement of the block from the coupler shank is impossible because of the restricted movement the block has between the arms of the yoke.

The operation of my improved coupler connection is as follows: During a buffing or inward movement the coupler is forced inwardly carrying the block B therewith, the force being transmitted through the curved surface 24 of the shank and the cooperating curved front face of the butt block. The butt block, through the rearwardly extending arms thereof, transmits the force directly to the front follower 17 of the railway draft rigging. As will be evident, during this buffing action lateral swinging movement of the coupler is permitted due to the swiveling action of the cooperating bearing surfaces of the coupler shank and the butt block B. Inasmuch as the rear edge of the coupler key C bears on the butt block B, there is substantially no swinging movement of the key. When a draft or pulling action is applied to the coupler the butt block B is pulled forwardly through the post member 25 of the shank. Forward movement of the block B is communicated to the key C, and through the latter to the yoke 16. As will be evident, during the draft movement the coupler shank swivels on the curved bearing seat provided between the arms of the butt block, the swinging movement taking place about the vertical axis of the post 25. In this connection it is pointed out that the convex bearing surface 30 at the forward end of the key slot 29 of the coupler shank provides for the necessary clearance between the front edge of the coupler key and the front wall of the slot during lateral swinging movement of the coupler.

Referring next to the embodiment of the invention illustrated in Figures 3 and 4, the coupler connection comprises broadly a coupler D; a butt block E; and a coupler key F.

The coupler D is of substantially the same design as the coupler A hereinbefore described and has a transverse opening 40 therethrough which is of the vertical cross section illustrated in Figure 4. The rear wall of the opening is formed by a vertical post-like section 41 which is formed integral with the coupler shank proper. The major portion of the post is of cylindrical cross section, that is, the surface at the front and sides thereof is truly cylindric, as indicated at 43, while at the rear of the post the curvature of the surface thereof decreases, as clearly shown in Figure 3. The rear surface proper of the post is preferably flattened, as shown. The front wall of the opening is defined by a concave surface 42 concentric with the cylindrical surface of the post. Midway between the top and bottom thereof the front face of the post 41 is notched to accommodate the coupler key, the walls of the notch being cut away at opposite sides of the longitudinal central axis of the mechanism, as clearly shown in Figure 3.

The butt block E is also of substantially U-shaped form and has spaced rearwardly extending side arms 44—44 and a front connecting section 45. The section 45 is disposed within the opening 40 and has a convex front bearing surface cooperating with the bearing surface 42. The arms 44—44 project inwardly beyond the post member 41 and embrace the latter. At the junction of the arms 44—44 with the section 45 the block E is provided with opposed curved bearing surface 46 which cooperates with the cylindrical bearing surface 43 of the post 41. The block E is transversely slotted as indicated at 47 to accommodate the coupler key F. The key F connects the coupler to the yoke which is indicated by 48. As will be clear upon reference to Figure 3, the rear edge of the coupler key extends slightly into the opening between the arms 44 and it is for the purpose of clearing the rear edge of this key that the post 41 is cut away at opposite sides as hereinbefore pointed out. The operation of my improved coupler connection, as shown in Figures 3 and 4, is substantially the same as that of the form of the invention described in connection with Figures 1 and 2. During a draft action the block E will be pulled forwardly by means of the post member 41, the post swiveling on the curved bearing surface between the arms 44—44. The forward motion will be communicated through the coupler key F to the yoke member. During a buffing action the butt block E will be forced rearwardly by engagement of the surface 42 of the coupler shank with the front end face of the block. The block E in its rearward movement forces the front follower of the railway draft rigging rearwardly also, inasmuch as the inner ends of the arms 44—44 bear directly on said front follower.

Referring next to the embodiment of the invention illustrated in Figures 5 and 6, the same comprises broadly a coupler G; a butt block H; a bearing plate J; and a coupler key K.

The coupler G and the butt block H are of substantially the same design as corresponding parts A and B described in connection with Figures 1 and 2. The coupler shank is provided with a transverse opening 50 through which the curved connecting front end section 51 of the butt block extends. The butt block has the rearwardly extending arms 52—52 thereof embracing the pivot post 53 which is of substantially cylindrical shape. Both the coupler shank proper and the transverse connecting section 51 of the butt block H are slotted to accommodate the coupler key K.

The bearing plate J is detachably connected to the rear ends of the arms 52—52 of the butt block and spans the opening between these arms. As shown, the bearing plate J has top and bottom forwardly extending lugs 56—56 at opposite sides thereof which engage above and below the top and bottom sides of the arms. Rivets 54—54, which extend through lugs 56—56, and the arms of the butt block H serve to secure the plate J to the butt block. The plate J bears directly on the usual front follower of the railway draft rigging. Between the arms 52—52 the plate J is provided with a forwardly projecting section 55 which has a concave seat accommodating the rear portion of the post 53. During a draft action the coupler proper swivels on the butt block H through rotation of the post section between the arms of the butt block. The pull is transmitted through the post, the butt block, and the coupler key in a manner similar to that hereinbefore described in connection with the other two forms of the invention. During a buffing action the pressure is transmitted through the curved front bearing wall of the opening in the coupler shank to the butt block H, and through the arms of the latter and the plate J to the front follower of the draft rigging. Swiveling action during the buffing movement takes place on the cooperating curved bearing surfaces of the butt block and the front wall of the opening of the coupler shank.

I have herein shown and described what I now consider the preferred manner of carrying out my invention, but the same is merely illustrative and I contemplate all changes and modifications that come within the scope of the claims appended hereto.

I claim:

1. In a coupler connection, the combination with a coupler having a shank provided with a transverse opening therethrough, said opening having a curved transverse front wall and a rear wall formed by a vertically disposed cylindrical post member integral with the coupler shank proper; of a butt block having spaced side arms and a curved transverse front end section connecting said side arms, said transverse section extending through said opening and being engaged with said front wall and post member, said arms extending rearwardly and embracing said post member; and an abutment plate secured to the inner end of said arms and spanning the opening therebetween, said plate having a curved surface on the front side therebetween, said curved surface being opposed to the rear surface of said cylindrical post member but spaced therefrom to provide clearance at all times between said post member and plate.

2. In a railway draft rigging, the combination with a movable member; of a coupler having a shank provided with a transverse opening therethrough, said opening being defined by a curved front wall and a rear wall formed by a post member on said shank; a butt block having spaced side arms and a transverse front end section connecting said arms, said end section extending through said opening and having a curved front fact having bearing engagement with said curved front wall, thereby transmitting the buffing force directly from the coupler shank to said block, said arms of the block embracing the post member and projecting rearwardly beyond the end of the shank proper of the coupler in bearing engagement with said movable member and holding said coupler shank out of bearing engagement with said movable member, said coupler shank and said transverse section of the block being slotted to receive a coupler key; and a coupler key extending through said shank and block.

3. In a coupler connection for railway draft riggings including a front follower, the combination with a coupler having a shank provided with a transverse opening adjacent the rear end thereof, said opening having a transversely curved front end wall and a rear wall formed by a post member integral with said shank, said post member having a curved bearing surface concentric with said curved front wall; of a butt block having spaced rearwardly extending side arms and a transverse front end section connecting said arms, said connecting section extending through said opening and having a curved front bearing surface engaged by the curved front surface of the shank, said side arms of said block embracing the post member and projecting rearwardly of the coupler shank proper and being in abutment with the follower of the draft rigging, the space between said arms rearwardly of said post being unoccupied; and a coupler key extending through said shank and block.

STACY B. HASELTINE.